(No Model.)

J. H. MITCHELL.
CAKE MACHINE.

No. 434,604. Patented Aug. 19, 1890.

Witnesses:
Henry N. Paul Jr.
E. Meyer

Inventor
J. Henry Mitchell
By
Hollingsworth & Fraley
attorneys

UNITED STATES PATENT OFFICE.

JAMES HENRY MITCHELL, OF PHILADELPHIA, PENNSYLVANIA.

CAKE-MACHINE.

SPECIFICATION forming part of Letters Patent No. 434,604, dated August 19, 1890.

Application filed September 21, 1886. Serial No. 214,115. (No model.)

*To all whom it may concern:*

Be it known that I, JAMES HENRY MITCHELL, of Philadelphia, in the State of Pennsylvania, have invented certain new and useful Improvements in Cake-Machines, whereof the following is a specification, reference being had to the accompanying drawings.

Figure 1:
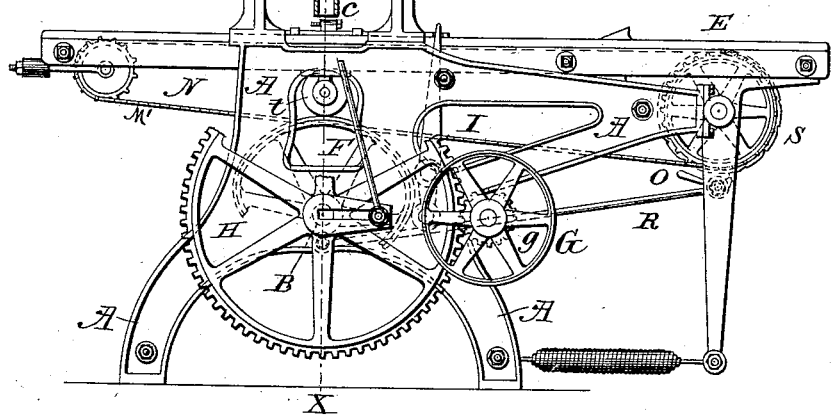
Figure 2:
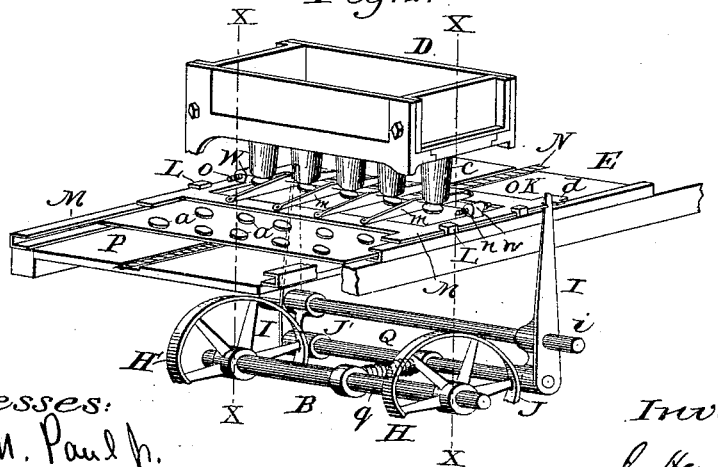

Figure 1 is a view, partly in side elevation and partly in vertical section, of the machine; and Fig. 2 is a perspective view of portions thereof, the housing being removed so as to show the interior construction of those parts to which the present invention is particularly related.

My invention belongs to that class of devices in which a dough-box having nozzles on its under side is provided with a follower or piston actuated at certain intervals to force out the dough through the nozzles, there being beneath said nozzles a table arranged to rise and fall at intervals, and also an endless belt for carrying pans along said table beneath said nozzles.

A machine of this general character is described in my Letters Patent No. 291,381, dated January 1, 1884, and for a better understanding of so much of the present machine as relates to the actuating mechanism of the follower in the dough-box, and of the dropping table and its pan-moving devices, I refer to said patent.

The use of wire knives or cut-offs in connection with soft-dough-cake machines is of course not new; but in all prior machines with which I am acquainted the cut-off device has been attached to or in some way connected with the dough-box or the frame of the machine, so that whether the dough-box moved away from the table or the table dropped from the dough-box in the act of depositing the cakes the cut-off knife or wire did not follow the movements of the table, but either followed those of the dough-box or those of neither of said elements. In the operation of such machines the cakes frequently hang to the wire or knife for an appreciable time after the cut has been effected, so that when the table drops away from said knife or the knife rises with the dough-box away from the table the cakes become distorted, and if they have failed to make contact with the pan during the cutting operation that part of the pan which is intended for their location is carried past, and when they drop they fall upon one another or are otherwise spoiled.

The chief object of the present invention is to remedy these difficulties by effecting the cut with rapidity and precision, and by maintaining a constant relation between the table or pan-surface and the wire knife or cut-off.

To this intent the invention primarily consists in mounting upon the table itself a sliding frame, which carries a wire knife or cut-off at a definite height above the surface of the table, said sliding frame being actuated alternately in opposite directions by suitable mechanism, whose movements correspond, as will be hereinafter described, with the movements of the dropping table.

In the drawings, A A represent the housings of the machine, D the dough-box, W the follower actuated by means of the screw $e$, which in turn is driven by a pawl-and-ratchet mechanism $p\ r$, actuated by means of a rod F from the shaft B. The dropping table E is caused to rise and fall at the proper intervals by means of the cams H, upon which rest the rollers $t$, secured to the bottom of the table E. The pans P are carried forward by means of the chain belt M', which is intermittently operated by means of the mechanism R O S, driven also from the shaft B. As this mechanism is not in any way concerned with the present invention, it is not deemed necessary to further particularize it beyond the fact that intermittent forward movements of the pans occur after the cakes of dough have been cut off and deposited thereon.

The pans P slide in the slotted ways M, arranged upon each side of the table E E, and upon the top of these ways are mounted on each side of the machine stationary guides L L. A frame K slides freely in the guides L L at a height above the pan-surface somewhat greater than that of the cake which is to be deposited thereon when cut. Said frame is provided on each side with a forked projection $d$, with which the lever-arms I engage. These lever-arms I are pivoted upon a transverse rod $i$, which is supported in the housings upon each side of the machine, and at the lower end of said levers I is a section-rod Q, supported at each end thereby. Upon the rod Q are mounted two cam-rollers J J', respectively, which are in contact with the cams H H', respectively, and about the center of the rod Q is a spring $q$, secured thereto and to the sleeve upon the driving-shaft B or other convenient part of the machine. This spring $q$ normally tends to draw the rod Q (and therefore the lower ends of the lever-arms I) toward the cams.

The frame K carries bridges $m$, arranged intermediately between the nozzles $c$ of the dough-box, and has also upon its sides bearings $w$, to which the wire cut-off $n$ is secured, preferably, by means of set-screws $o$, for tightening said wire, as indicated in the drawings. Said wire $n$ passes through and is supported by the bridges $m$, and the height of the said bridges and the screws $o$ is such that when the table is in its highest position the wires will just pass clear of the bottom of the nozzles $c$.

The operation of the cut-off is as follows: The table E being in its highest position, the dough is forced out by the plunger from the nozzles $c$, and the position of the frame K is such that the wire cut-off $n$ is upon the right-hand side of the nozzles. The cams H H' then engage (at their right-hand ends) with the rollers J J', and the shape of the cam-surface is such as to throw said rollers J J' rapidly away from the axis of rotation of the cams. This throws the lower ends of the lever-arms I toward the right and their upper ends toward the left, (in Fig. 1,) causing the frame to travel rapidly to the left in its guides L L and throw the wire with a quick clean cut across the ends of the nozzles $c$ and effectually detach the dough therefrom. As the travel of the cams H H' continues the table E drops, and with it the frame and knife, until the lowest position of the table is reached, when the rollers J J' are released from the cams H H', and the spring $q$ draws the rod Q, and consequently the lower end of the levers I, toward the driving-shaft B with a quick movement. This throws the upper end of the lever-arms I toward the right, (in Fig. 1,) and consequently carries the frame K and cut-off $n$ back to their original position, ready for a fresh cut. It will be noticed that when this return movement takes place the wire is far below the lower ends of the nozzles, having dropped down with the table, as described, and the cakes being upon the pan when the return movement occurs the wire will effectually detach itself from them, since they will adhere more firmly to the pan than to the wire by reason of their larger superficial contact with the former. The forward movement of the pans P (having on them the deposited cakes $a$) occurs after this depression of the table and the return movement of the wire cut-off $n$. The table then rises for a fresh deposit and the cutting-off takes place as before.

Although I deem the apparatus above described the best embodiment of my invention, so far as the frame and wire are concerned, I do not desire to limit myself to this exact form, since the character of the knife and its method of attachment to the frame and the method of actuating the frame itself may be greatly varied without affecting the main principle of my invention, which consists in mounting the knife at a comparatively short distance from the surface of the table and so combining it therewith as that it shall follow the rising and falling movements thereof, thus always maintaining a permanent relation to the surface of the table, whereby the difficulties arising from the tendency of the cakes to adhere to the knife are minimized.

As before stated, I am aware that the use of a knife in connection with a rising and falling dough-box is not new, and I am also aware that the use of a rising and falling table in connection with a dough-box is not new. I therefore disclaim such combination, broadly; but,

Having thus described my invention, I claim—

1. In a cake-machine, the combination of a nozzled dough-box, a pivoted dropping table beneath said box, mechanism, substantially as described, for effecting the rising and falling motion of said table, a cut-off device mounted to slide at a permanent horizontal distance from the surface of said table, and mechanism, substantially as set forth, whereby said cut-off is reciprocated lengthwise with the table at proper intervals during each complete rising and falling movement thereof.

2. The combination, with the nozzled dough-box and the rising and falling table, of a frame sliding directly upon said table, a cut-off mounted upon said frame, and bridges upon said frame mounted between the nozzles of the dough-box to afford an intermediate support for the cut-off, substantially as set forth.

3. The combination, with the nozzled dough-box and the rising and falling table, of a frame mounted directly upon said table to slide lengthwise thereof, a cut-off mounted upon said frame, a lever connected with said frame, and a cam engaging with said table to raise and lower the same, and also engaging with said lever to reciprocate the cut-off in a definite relation to the rising and falling movements of the table, substantially as set forth.

JAMES HENRY MITCHELL.

Witnesses:
HENRY N. PAUL, Jr.,
E. MEYER.